Jan. 30, 1923.

L. M. MASSON.
AUTOMATIC ADJUSTMENT DEVICE FOR MECHANICAL TRANSMISSION GEARS.
FILED APR. 16, 1920.

Inventor
L. M. Masson,
By H. R. Kerslake
Attorney

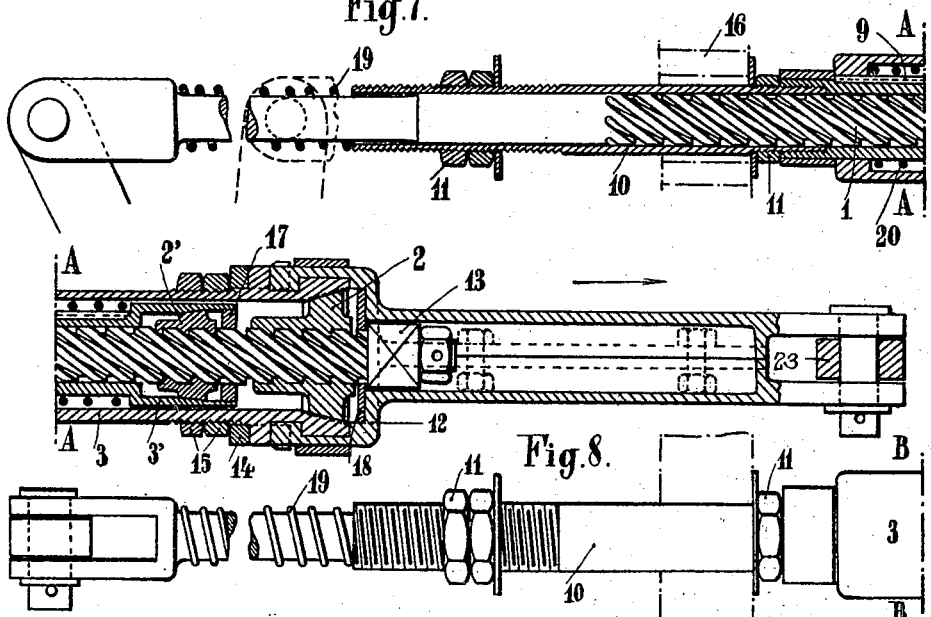
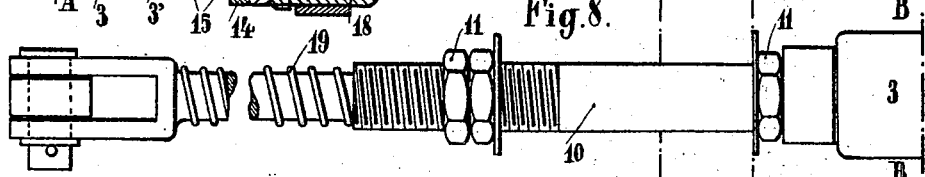
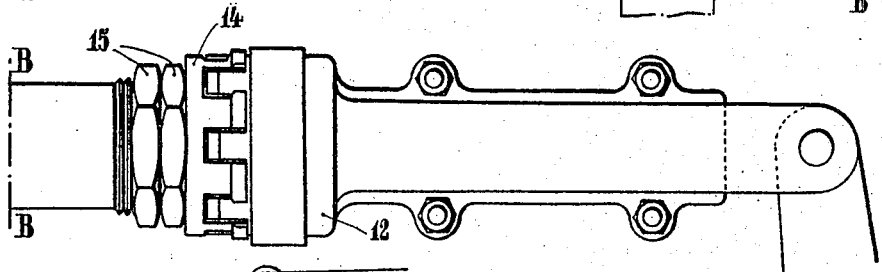
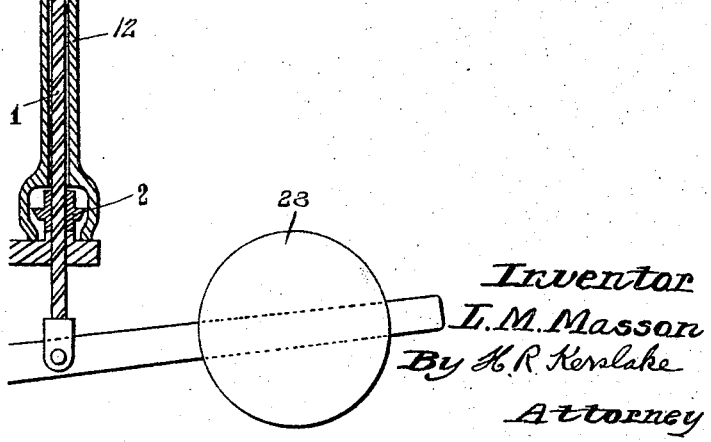

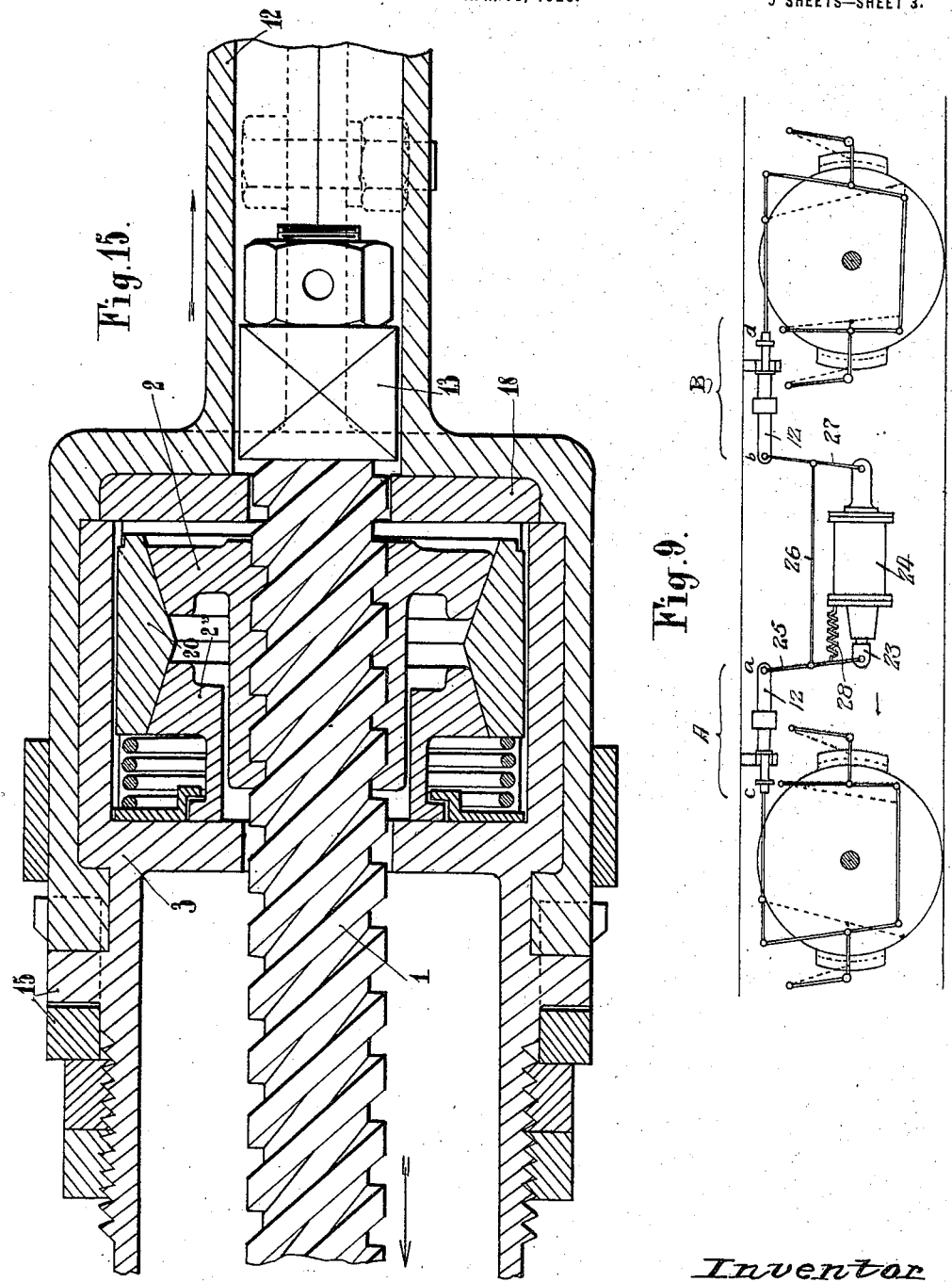

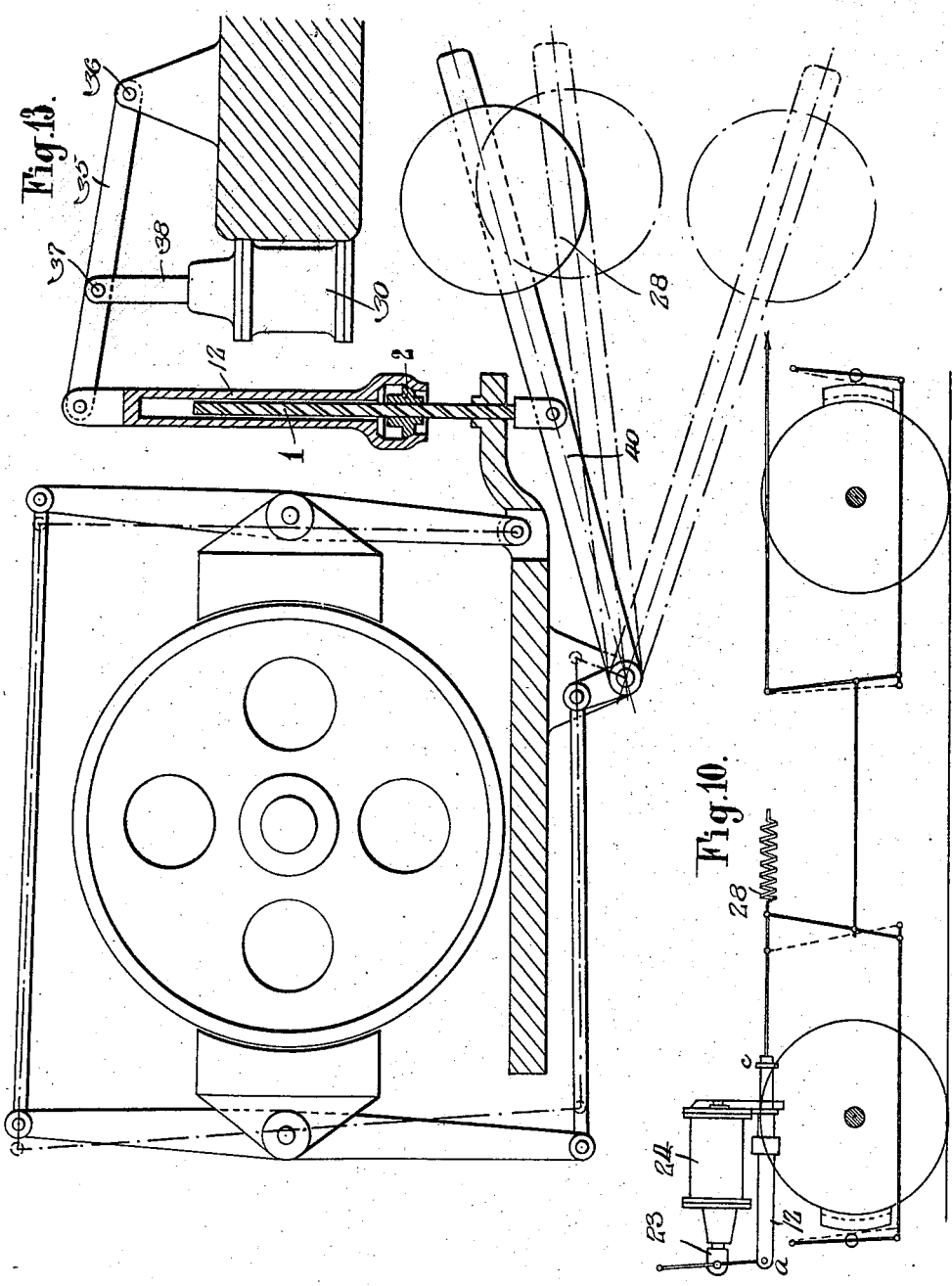

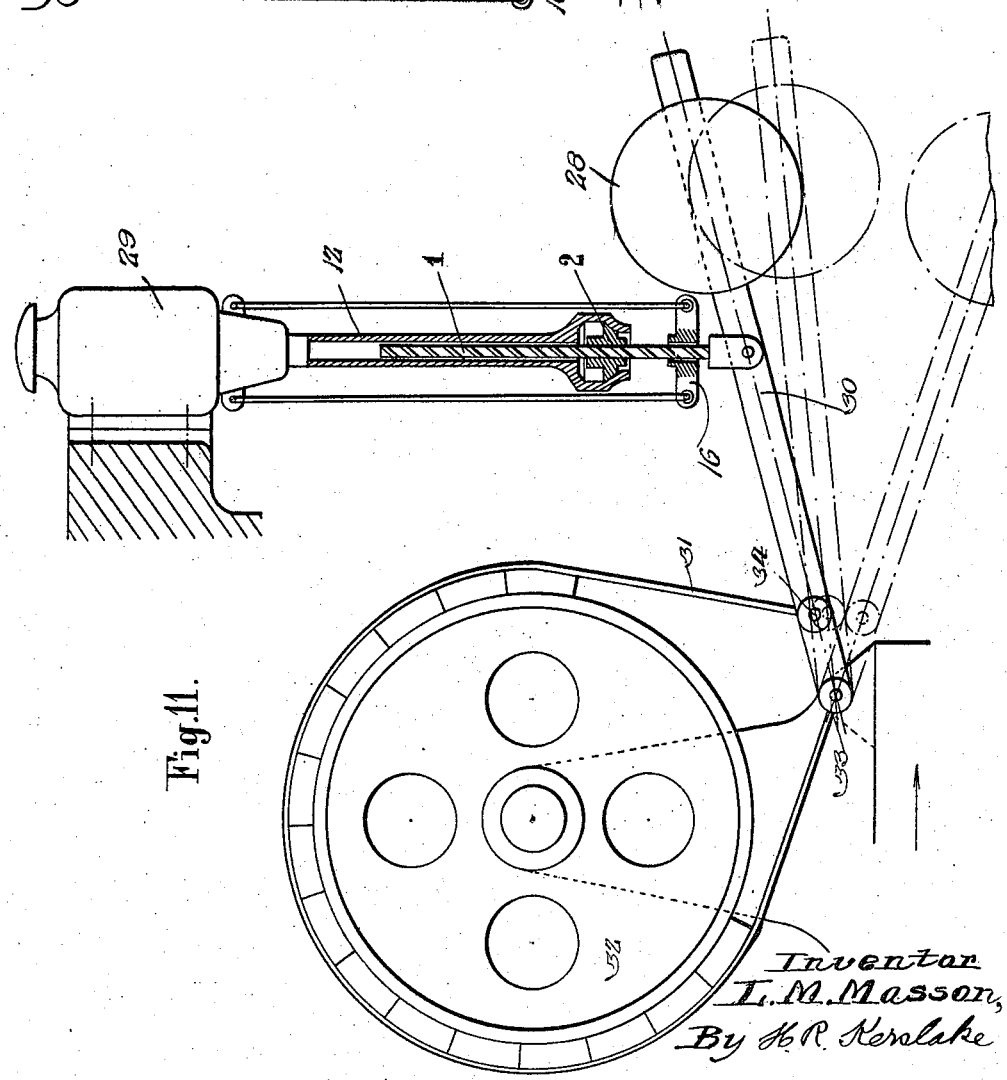

Patented Jan. 30, 1923.

1,443,630

UNITED STATES PATENT OFFICE.

LOUIS MAXIME MASSON, OF ROMAINVILLE, FRANCE.

AUTOMATIC ADJUSTMENT DEVICE FOR MECHANICAL TRANSMISSION GEARS.

Application filed April 16, 1920. Serial No. 374,380.

*To all whom it may concern:*

Be it known that I, LOUIS MAXIME MASSON, a citizen of the French Republic, and resident of Romainville, Seine, France, have invented certain new and useful Improvements in Automatic Adjustment Devices for Mechanical Transmission Gears, of which the following is a specification.

This invention relates to an automatic adjustment device for mechanical transmission gear, and is designed to maintain a constant value for the distance between two points in the said transmission gear regardless of the variations of length which may occur in this gear, for instance by reason of the wear of the several parts. This device is essentially characterized by the fact that one of the constituent elements of the mechanical transmission gear is formed in two parts which during the movement in one direction are adapted to be displaced with reference to each other in order to obtain the compensating effect, while during the movement in the opposite direction, the said constituent elements are held blocked together in the relative positions which they occupied at the time of the reversal of the movement.

The device embodying the present invention is chiefly applicable to brake gear for railroads or tramways in which the compensating effect is to take place in such manner as to maintain a constant value for the distance between the brake shoes and the wheels, or for the stroke of the operating devices of the said brake gear.

In a more special manner, the automatic compensating device is essentially characterized by the use of two elements of the mechanical transmission which are designed to be automatically subjected to relative displacements, these two elements consisting of a screw having several threads steeply inclined and in the same direction of a very quick motion type and a corresponding nut for this screw. The movement of the mechanical transmission system in one direction causes the motion of the nut with reference to the screw, while the movement of the said transmission in the opposite direction will cause these two members to become locked together in the relative positions which they occupied at the end of the preceding movements.

Referring to the accompanying drawings which are given by way of example:

Figs. 7 and 8 represent respectively a longitudinal section and an exterior view of the combination of the principal adjustment device and the auxiliary adjustment device for brake gear in the same apparatus comprising a single screw and two nuts.

Fig. 9 represents the device (Figs. 7 and 8) applied to the operating bars of brake gear employing eight brake shoes.

Fig. 10 relates to the arrangement in which the adjustment device is operated by the brake cylinder through a lever, the fixed stop point being mounted upon the cylinder.

Fig. 11 shows the method of mounting an electro-magnetically operated adjustment device upon an emergency band brake.

Fig. 12 shows the same adjustment device in the off position, with the counterweight thrown down.

Figs. 13 and 14 are views corresponding respectively to Figs. 11 and 12, showing the application of the device to a shoe brake provided with counterweight and operated by an air cylinder.

Fig. 15 shows another embodiment of the adjustment system.

As already set forth, one of the elements of the transmission system is constituted of two members which are disposed for automatic displacement with referen e to each other, these members consisting respectively of a screw 1 having several threads steeply inclined and in the same direction and of the quick-motion type and having a suitable number of threads, and a corresponding nut 2. The nut 2 is disposed within a coupling strap or holder 3, and is slidable upon the axis of the holder in such manner as to bear upon the latter either through its conical end or the plate 4. This disk can be striated upon the side which comes in contact with the holder 3.

Figure 1:
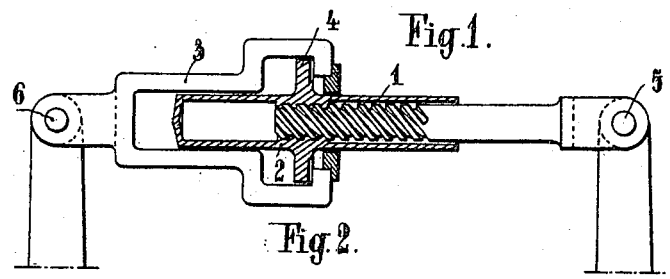
Figs. 1 and 2 are respectively elevation partly in section and plan views of the device embodying the present invention, as applied to cases in which by reason of the effort exerted upon the transmission gear, two points situated respectively upon the screw member and the nut member shall have a tendency to approach each other.
Figure 2:
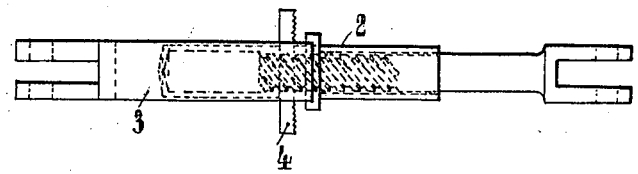

In Figs. 1 and 2, the nut 2 is represented as in contact with the cap 3 through the plate 4; if the cap 3 and the nut 2 are brought closer to each other, they then come in contact, the cap 3 by its bottom plane, the nut 2 by its conical bottom or end. In the example shown by these figures, the screw 1 is connected with the other transmission element by its end 5, and the cap by its end 6; that is to say, that the pivots 5 and 6 are located at opposite ends of the assemblage formed by the screw 1, the nut 2 and the cap 3.

Under the action of forces tending to bring the cap 3 and the screw 1 towards each other, the screw 1 and the nut 2 are moved relatively to the cap 3 until the conical end of the nut 2 bears on the flat bottom or end of the cap; at this moment the nut and the cap are in contact by a very small surface. If the forces are continuously applied the nut 2, no longer being capable of translation at the same time as the screw, rotates on said screw, thus permitting the translation of this latter. As stated above, the nut 2 is permitted to rotate from the fact that it is in contact with the cap 3 by a very small surface which produces a negligible amount of friction.

Consequently, the device represented on Figs. 1 and 2 permit of reducing the initial distance between the points 5 and 6.

On the contrary, this apparatus prevents any increase of the initial distance between 5 and 6, or of the distance decreased by the relative movement of the screw 1 and the nut 2 in the above described period. In fact, when the forces applied on the cap, on the one hand, and the screw, on the other, tend to separate these two parts, the blocking plate 4, when the movement of translation permitted by the cap 3 is terminated, is applied on the cap 3 and, through its corrugated denture, opposes the rotation of the nut 2 with a resistance sufficient to check any movement of this latter relative to the screw 1. These two movable elements of the transmission are thus held fixed and rigid in the relative positions which they have reached during the preceding period, deducting the movement permitted by the cap 3 for the nut 2.

Figure 3:
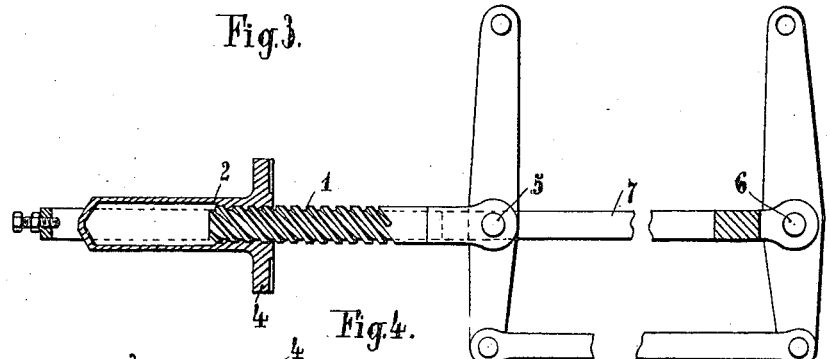
Figs. 3 and 4 represent respectively elevation and plan views showing the application of the device in cases whereby reason of the effort exerted upon the transmission gear, two points situated respectively upon the screw member and the nut member shall on the contrary have a tendency to separate from each other.
Figure 4:
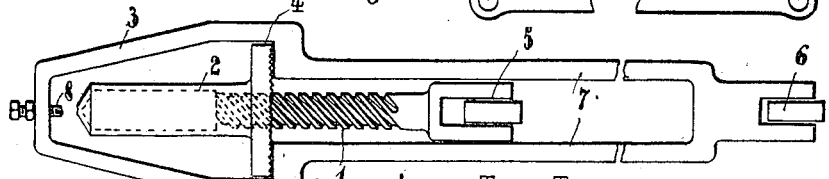

The example illustrated on Figs. 3 and 4 is similar to that shown on Figs 1 and 2, and comprises the same elements; but the latter are arranged to permit of the increase of the initial distance between the points of connection of the apparatus from the rest of the transmission, the reduction of this distance or of the distance finally attained being prevented.

In this example, the pivots points 5 and 6 are located on the same side of the apparatus, instead of on opposite sides, as in the preceding example; for this purpose the cap 3 is extended by the rods 7.

The operation of the device is obviously the same, that is, that it permits the screw and the cap to be brought relatively closer to each other, preventing their separation. But, while in the first case the screw and cap were brought together through forces tending to bring the points 5 and 6 closer to each other, in the example of Figs. 3 and 4, this is accomplished by reason of forces tending to separate the points 5 and 6. Likewise, the separation of the cap and of the nut would be effected by forces tending to bring the points 5 and 6 closer to each other.

Figures 5, 6:
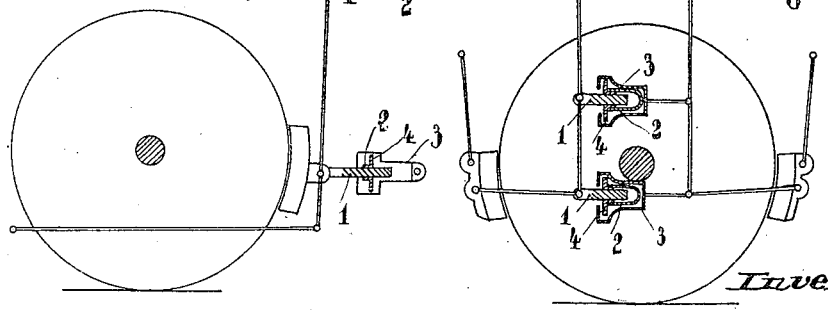
Fig. 5 shows the application of the adjustment device upon brake gear having four brake shoes upon the same axle.
Fig. 6 shows the methods employed with an air-brake cylinder, with adjustment for the brake shoes.

Fig. 5 shows a brake drum with four shoes mounted on the axle itself, in which the points 5 and 6 are connected by means of a bar of constant length; to render the description clear, the points 5' and 6' are connected by an arrangement according to the first example, (Figs. 1 and 2) instead of being independent of each other, as in usual devices of this type.

The driving force, applied at 21 in the direction of the arrow, acts to bring the points 5' and 6' closer to each other, in well known manner. These points being connected by a device according to the first example, as stated they are permitted to approach each other.

The operation is as follows:

1. On locking, the point 22 being fixed, the two points 5' and 6' tend to approach each other; now, the elements of the regulating device should be at first arranged in the same manner as in Fig. 1, the nut 2' being in contact with the cap 3' through the plate 4'. The assemblage of the screw and nut moves freely with respect to the cap 3'. This free movement may take place over a length such as to result in the locking of the shoes.

If the shoes are not yet locked at the moment at which the nut 2' comes in contact with the cap 3' through its conical portion, or also if any wear is produced during braking, there will be a rotation of the nut 2 and relative movement of the screw and the nut; in other words, the initial distance between the points 5' and 6' will be reduced on unlocking for the length of the movement of the screw with respect to the nut.

2. On unlocking, the drive force acting at 21 in the direction opposite that of the arrow, it tends to separate the points 5' and 6'; the screw and nut assemblage then moves freely in the cap, until the plate 4 comes in contact with the cap 3. From this moment on the points 5' and 6' can no longer be separated; as stated above, the distance between the points 5' and 6' then becomes what it originally was, less the corresponding wear; consequently, by means of this device the travel of the shoes is regulated automatically, or in other words, the motive stroke, to a constant value. However, it is to be noted that the point 21 does not return strictly to its original position. In order for this to take place it would be necessary for the points 5 and 6 to approach, without being able to separate from each other. Thus, if the rod of constant length uniting the points 5 and 6 is replaced by a second regulating device of the first example, it will not only be possible to hold the motive force constant, but also to maintain the initial position of the drive element.

Consequently, the use of the two regulating devices on the same transmission is necessary to permit maintaining constant all the operative characteristics of the transmission. In the example of Fig. 5, the two points 5 and 6, which have been shown as connected by means of a rigid rod, are as a matter of fact connected by means of a second regulating device of the type shown on Fig. 1, which permits of their being brought closer but prevents their separation.

Fig. 6 shows a similar application on an air brake cylinder, with regulation of the shoes, necessitating the use of two regulating devices of the second example.

On locking, the air cylinder acts, in the direction of the arrow, on a cap 3, arranged in the same manner as in Figs. 3 and 4; the points 5 and 6 cannot approach except during the free movement of the cap 3 relative to the nut 2. On the contrary, the points 5' and 6' may separate, which permits of locking, with taking up of the wear. On unlocking, the points 5' and 6' cannot approach except for a determined amount (also regulable by means of screw 8, Fig. 4). On the contrary, the points 5 and 6 may separate, which permits the rod of the air cylinder to return accurately to its initial position.

Two regulating devices necessary for each transmission of movement may however be disposed in such manner as to constitute a single apparatus containing a single screw having two nuts movable thereon. As shown in Fig. 7, this double adjustment device consists of a quick-motion screw with reversible movement and provided with a plurality of threads in the same sense, the screw ending in a fork which is attached to one of the levers of the transmission gear. Upon this screw is mounted the movable nut 2 of large diameter for the principal adjustment and a nut 2' of smaller diameter for the auxiliary adjustment.

These two nuts are movable upon the screw 1 under the action of an effort which is exerted upon them near their centers, while on the other hand, when it is desired to hold the nuts in the fixed position, they now come in contact through an outer conical portion of larger diameter, which has the effect of increasing the friction by the jamming or the wedging action of the conical parts, thus setting up a mechanical resistance which prevents rotation and which locks the nuts and the screw together in such manner as may be required for any given direction of operation. For this purpose the nut 2 may be provided on its conical portion with corrugations or grooves parallel to the generatrices, and which are shown in dotted lines on Fig. 7.

The screw 1 and the nuts 2, 2', are contained in a cap or casing 3 provided at one end with a conical portion which receives and retains the nut 2 of the principal adjustment device. The casing 3 contains slidable therein a cap or sleeve 3' which is also provided at one end with a conical portion for receiving and retaining the nut of the auxiliary adjustment device 2'. The sleeve 3' is prevented from rotating by means of the key 9. The sleeve terminates at one end in the tube 10 which carries the adjustment nuts 11 whose spacing determines the amount of clearance of the brake shoes which it is desired to obtain, which position is adjusted once for all at the time when the adjustment device is mounted upon the transmission gear.

The casing 3 is connected to a hollow cap or slide chamber 12 which is made in two pieces and terminates in a fork for the purpose of connecting to the operating lever of the brakes or the lever of the air cylinder. This hollow member 12 has an internal square section in order to provide for the free sliding motion of a square sliding head 13 disposed upon the end of the screw 1 and designed to prevent the rotation of the screw 1 with reference to the member 12 under the torque due to the screw 1.

Since the rotation of the nut 2 has a tendency to effect the rotation of the casing in one direction, while the action of the screw 1 and the head 13 will tend to produce a rotation of the member 12 in the other direction, these two parts can be held in place and any rotation of the member 12 with reference to the casing 3 can be prevented by the use of a ring 14 provided with claws which is held tightly in place by means of a nut and a lock nut 15.

The motive force causing the locking is applied to the regulating device through a lever 23 which exerts traction on the slide 12 in the direction of the arrow (Fig. 7) in such manner that the adjustment device is displaced until the nut 11 comes in contact with the fixed stop-piece 16 forming a stationary point which is not subject to displacement. The lug 16 is integral with the base of the apparatus comprising the element to be braked, as for example, the chassis of the vehicle 22, in Figs. 9 and 10. At this moment the nut 2 comes in contact with the casing 3 and this latter continues to advance carrying with it in its movement the screw 1, and this action causes the brakes to be thrown on. During this period, the nut 2' of the auxiliary adjustment device which is also drawn along by the screw 1, is separated from the sleeve 3' and now butts against the ring 17 fixed solidly upon this sleeve at its smallest diameter and the said nut will now rotate so as to allow the screw 1 to move forward.

Upon the return stroke, the nut 2' comes in contact through its conical portion with the sleeve 3' and as it is thus prevented from rotating, it pushes against the sleeve and the tube 10 up to the moment when the oppositely situated nut 11 comes in turn against the stop-piece 16.

The sleeve 3' and the nut 2' are now held in place upon their return stroke. The screw 1 is locked during the time that the member 12 and the casing 3 continue on their back stroke under the action of the return springs. The nut 2 comes in contact at its smallest diameter with the ring 18 which is solidly fixed to the casing 3, and this nut rotates while moving along the screw 1 in order to reach its initial position.

The forward motion of the screw 1 with reference to the stop piece 16 during this period of throwing the brakes on and off, corresponds to the amount of wear of the brakes which has occurred during the preceding braking action. The springs 19 and 20 are employed to effect the return of the operating members and to produce the motion of the nut 2 at the time of throwing off the brakes. When the brakes are worn out and require to be replaced, the screw 1 must be brought back by the same length to which it has been displaced within the member 12. To carry this out, all that is required is to loosen the nuts 15, to take off the ring 14 and the member 9 and to rotate the casing in order to screw the nuts 2 and 2' upon the screw 1, thus bringing the latter into the position which it originally occupied at the start. These arrangements are applicable to all classes of brakes for which it is required to adjust the operating stroke in function of the wear of the rubbing parts of the brake members.

As previously intimated, Figs. 9 and 10 relate to the application of the device shown on Figs. 7 and 8, to vehicle brake drums, with eight shoes in the case of Fig. 9, and only four in the case of Fig. 10.

Referring to Fig. 9, the piston 23 of the air cylinder 24, on locking, exerts a thrust action in the direction of the arrow on lever 25, which, through levers or rods 26 and 27, causes traction on the slides 12 of the regulating devices mounted at A and B. The operation of these devices has been described above; it is hence evident that the brake shoes are applied on the wheels as if the regulators at A and B were rigid. Assuming that the wear is of such extent that the elements assume the position represented in dotted lines on Fig. 7, when the motive force of the piston 23 ceases and the spring 28 brings the elements to their original position, the regulators A and B, as already explained, acts in such manner that the points $a$ and $b$ resume their original position, but at the distance $a$—$c$ and $b$—$d$, less the extent corresponding to the wear on the shoes.

In the example of Fig. 10, a single regulator is obviously sufficient, since each wheel comprises but one brake shoe; the locking is effected by a thrust of the piston 23 in the direction of the arrow, and the operation is identically the same as that previously described.

In the example represented by Figs. 11 and 12, as well as those of Figs. 13 and 14, the motive force intended to effect the braking is provided by the action of a counterweight 28 which, on unlocking, is held by an electromagnetic device 29 (Figs. 11 and 12) or a piston of an air cylinder 30 (Figs. 13 and 14).

In Figs. 11 and 12 the slide 12 is connected to the electromagnetic device and the screw 1 to the lever 30 of the counterweight 28. The lug 16 is attached to the case or frame of the electromagnetic device. The brake band 31, which is wound on the pulley 32, is attached at 33 to the axis of rotation of the lever 30 and at 34 to another point of this lever. Fig. 11 represents the whole in the raised (unlocked) position, with dotted lines, the lever 30 and the counterweight 28 in two braking positions, one corresponding to no wear, the other to accentuated wear (or the brake shoes). Fig. 12 shows the regulating device in the locking position.

The example of Figs. 13 and 14 differs from the preceding in that the brake is a shoe brake instead of a band brake, but the operation does not differ. The slide 12 is attached to the end of the lever 35, pivoted to the frame at 36, and subject at 37 to the action of the piston 38 of the air cylinder 30. The screw 1 is attached to the lever 40 of the counterweight 28. Fig. 13 shows the assemblage in the unlocked position, showing, in dotted lines, the lever 40 and the counterweight 28 in the locking position, one corresponding to no wear, the other to accentuated wear. Fig. 14 shows the regulating device in the locking position.

In order to diminish the diameter of the nuts 2, 2' for the purpose of reducing the general size of the adjustment devices, while maintaining the safe operating value of the mechanical resistance due to the blocking effect of the conical parts, the device may contain two nuts which fulfil the function of a single nut, as shown by way of example in the embodiment represented in Fig. 15.

In this case, the operation takes place as follows. For the operation of braking, and when the movement takes place in the direction of the arrow, the casing 3 drawn by the member 12 transmits the effort to the nut 2" which is slidable on a square portion of the nut 2. The thrust of the nut 2" is transmitted to the nut 2 through the medium of a double cone shaped ring 20 which is sliable within the casing 3 but is prevented from rotating. The opposing mechanical action is doubled in this way by reason of the friction of the two nuts 2' and 2" whose effects are added together. When the brakes are thrown off, the action is the same as in the alternative form shown in Fig. 7.

Having now described my invention, what I claim as new and desire to secure by Letters Patent is:

1. In a device of the character described the combination with two members mounted for movement relative to each other of a screw having several threads very steeply inclined in the same direction connected to one of the members, a nut corresponding to said screw and means to connect said nut to the other member.

2. In a device of the character described the combination with two members mounted for movement relative to each other of a screw having several threads very steeply inclined in the same direction connected to one of the members, nuts corresponding to said screw, caps enclosing said nuts, and connecting them to the other member.

3. In a device of the character described the combination with two members mounted for movement relative to each other of a screw having several threads very steeply inclined in the same direction connected to one of the members, nuts corresponding to said screw, caps enclosing said nuts and connecting them to the other member, means to brake the rotary movement of the nuts in a determined direction, said rotation being permitted in the contrary direction.

4. In a device of the character described the combination with two members mounted for movement relative to each other of a screw having several threads very steeply inclined in the same direction connected to one of the members, nuts corresponding to said screw, caps enclosing said nuts and connecting them to the other member, corresponding corrugated surfaces on the caps and their respective nuts for ensuring the braking of the rotary movement of the nuts in a given direction, a chamber inside of each cap in which the nuts may move longitudinally so as to be able to rotate in the direction reverse to the preceding direction, substantially as described.

5. In a device of the character described the combination with two members mounted for movement relative to each other of a screw having several threads very steeply inclined in the same direction connected to one of the members, nuts corresponding to said screw, caps enclosing said nuts and connecting them to the other member, corresponding conical surfaces on the caps and their respective nuts for ensuring of the braking of the rotary movement of the nuts in a given direction, a chamber inside of each cap in which the nuts may move longitudinally to rotate in a direction reverse to the preceding direction, and means to prevent the rotation of the caps with the nuts.

6. In a device of the character described the combination with two members mounted for movement relative to each other of a screw having several threads very steeply inclined in the same direction connected to one of the members, a pair of nuts corresponding to said screw, caps enclosing said nuts and connecting them to the other member, corresponding conical surfaces on the caps and their respective nuts, a chamber inside of each cap in which the nuts may move longitudinally, a key mechanism permitting longitudinal movement of one of the caps and rendering it integral, for rotation, with the second cap, a third two-part cap connected to the second cap, and a locking connection rendering said other or second cap completely integral with the third two-part cap.

7. In a device of the character described the combination with two members mounted for movement relative to each other of a screw having several threads very steeply inclined in the same direction connected to one of the members, a pair of nuts corresponding to said screw, caps enclosing said nuts and connecting them to the other member, corresponding conical surfaces on the caps of their respective nuts, a chamber inside of each cap in which the nuts may move longitudinally, a key mechanism permitting longitudinal movement of the one cap and rendering it integral, for rotation, with the other or second cap, a third two-part cap connected with the second cap, a locking connection rendering said second cap completely integral with the third two-part cap, a slide carried by said third cap for guiding the translation movement of the screw, and a head having a parallelepipedic form carried on the screw and sliding in said slide.

8. In a device of the character described the combination with two members mounted for movement relative to each other of a screw having several threads very steeply inclined in the same direction connected to one of the members, a pair of nuts corresponding to said screw, caps enclosing said nuts and connecting them to the other member, corresponding conical surfaces on the caps and their respective nuts, a chamber inside of each cap in which the nuts may move longitudinally, a key mechanism permitting longitudinal movement of one cap and rendering it integral, for rotation, with the other or second cap, a third two-part cap connected to the second cap, a locking connection rendering said second cap completely integral with the third two-part cap, a slide carried by said third cap for guiding the translation movement of the screw, a head having a parallelepipedic form carried on the screw and sliding in said slide, and resilient withdrawal means for returning the caps to their initial positions.

9. In a transmission device of the character described the combination with two members mounted for movement relative to each other of a screw having several threads very steeply inclined in the same direction connected to one of the members, two nuts corresponding to said screw, caps enclosing said nuts and connecting them to the second part of the transmission, corresponding conical surfaces on the caps of their respective nuts, a chamber inside of each cap in which the nuts may move longitudinally, a key mechanism permitting longitudinal movement of one of the caps and rendering it integral, for rotation with the other or second cap, a locking connection rendering said second cap completely integral with the third two-part cap, a slide carried by the third cap guiding translation movement of the screw, a head having a parallelepipedic form carried on this screw and sliding in said slide, resilient withdrawal means returning the caps to their initial positions, and a stop member adapted to be varied in position on the first cap for regulating the travel of the brake shoe, substantially as described.

In testimony whereof I have signed my name to this specification.

LOUIS MAXIME MASSON.